United States Patent [19]

Layer

[11] Patent Number: 4,791,173
[45] Date of Patent: Dec. 13, 1988

[54] TIRE TREAD RUBBER COMPOSITIONS

[75] Inventor: Robert W. Layer, Silver Lake, Ohio

[73] Assignee: The B F Goodrich Company, Akron, Ohio

[21] Appl. No.: 74,826

[22] Filed: Jul. 17, 1987

Related U.S. Application Data

[63] Continuation-in-part of Ser. No. 854,858, Apr. 22, 1986, abandoned, which is a continuation-in-part of Ser. No. 775,965, Sep. 13, 1985, abandoned.

[51] Int. Cl.[4] .............................................. C08C 19/20
[52] U.S. Cl. .................................... 525/236; 525/194; 525/237; 525/349; 525/352
[58] Field of Search ............... 525/194, 236, 237, 349, 525/351, 352

[56] References Cited

U.S. PATENT DOCUMENTS

4,041,043  8/1977  Gattuso ............................... 525/349
4,119,588 10/1978  Carpino ............................... 525/349
4,309,318  1/1982  Ahagon ............................... 525/349
4,487,892 12/1984  Ohmori ............................... 525/237
4,499,228  2/1985  Ogawa ................................ 524/413

Primary Examiner—Christopher Henderson
Attorney, Agent, or Firm—Alfred D. Lobo; Alan A. Csontos

[57] ABSTRACT

A synthetic rubber (SR) tire tread of styrene-butadiene rubber (SBR) and butyl rubber which SR is essentially free of natural rubber (NR), upon vulcanization with sulfur in the presence of a combination of sulfenamide accelerators, provides excellent oxidative stability, resistance to hardening, and flex resistance, despite increasing the level of sulfur to an amount in the range from 2.0–3.0 phr, as long as the total amount of sulfenamide accelerators is less than 2.0 phr and there is more TCS than BTS. The crosslink network generated by the use of TCS in combination with BTS, which combination produces poor oxidation stability in a predominantly NR containing rubber, is not produced in SR.

7 Claims, 4 Drawing Sheets

TIRE TREAD RUBBER COMPOSITIONS

BACKGROUND OF THE INVENTION

This invention relates to vulcanized synthetic rubber compositions. The considerations relating to vulcanizing a predominantly natural rubber (NR) composition are different from those for vulcanizing synthetic rubber (SR). For example, SR is essentially free of a proclivity to reversion upon vulcanization with sulfur. Tire tread requires a vulcanizate which is oxidation stable, highly durable under driving conditions, along with good wet and dry traction, low rolling resistance, inter alia, yet with sufficient flexibility to withstand deformation during use. Increasing the amount of sulfur decreases stability to oxidation (also refered to as 'oxidation' or 'oxidative' stabililty) when used with known accelerators in conventional ratios. As a result, the tire manufacturing industry has progressively lowered sulfur levels and increased the amount of accelerator used.

Vulcanization of rubber with sulfur is a complicated process which is not fully understood. A variety of chemical compounds ("products" to avoid confusion with tread compounds) are formed depending upon the type of rubber, the sulfur level, the accelerator and activator used, etc. For example, unaccelerated sulfur vulcanization produces long polysulfide crosslinks approaching 50 S atoms per crosslink. Relatively low concentrations of sulfenamide accelerators produce "long" crosslinks containing from about 3 to about 10 sulfur atoms per chain which is referred to as a "polysulfide" chain or crosslink. Sulfur donor systems give even shorter crosslinks—about 3 S atoms per chain. Relatively high concentrations produce short crosslinks containing 1 or 2 sulfur atoms per chain, referred to as monosulfide and disulfide chains or crosslinks, respectively. Finally, a "sulfurless" cure system which uses only accelerators which are sulfur donors, gives about 1.5 S atoms per chain.

Besides crosslinks or chains, a variety of other products such as cyclic sulfides and disulfides, conjugated dienes and trienes, and pendant accelerator groups attached through sulfur to the backbone, are also formed. Each of these affects the physical properties of the vulcanizate. Although relationships between physical properties of vulcanizates and many of these compounds have been intensively studied, the relationships and the resulting properties are unpredictable.

Because the proportionate amount of each compound formed in the vulcanizate depends so heavily on the type of rubber used, the type of sulfur, the type and thermal history of the carbon black, in addition to so many other factors, for example the sulfur level, whether oil extended, the type of accelerators and sulfur donors used, the amount of pigments and fillers such as silica, if these are used, inter alia, it is well accepted that it is implausibe to make logical deductions with reasonable assurance from measurements of physical properties obtained with a particular cure system and rubber compound, from properties obtained with a similar cure system but a different type of rubber.

More particularly this invention relates to the use of a combination of compounds from the classes of benzothiazole sulfenamide (BTS) and thiocarbamyl sulfenamide (TCS) accelerators each of which has good scorch safety, but the TCS is more efficient. By "efficient" I mean that TCS provides the same density of crosslinks with a lesser amount (than BTS) in the same or less time. The improved efficiency (about 30% better) of the TCS results in the formation of a crosslink network which is "shorter" than the network produced by BTS. The vulcanizate therefore has different properties. TCS improves thermal and oxidative stability of SBR vulcanizates and also gives lower permanent set and heat buildup. However TCS adversely affects tear strength and flex life.

My goal was to take advantage of the efficiency of the TCS in combination with the BTS in such a way as to use a lower net amount of accelerators and to increase the amount of sulfur.

The goal of Carpino in U.S. Pat. No. 4,119,588 (hereafter the '588 patent) was to overcome the proclivity to reversion in a NR tread compound. He succeeded in doing so, but when he used more than 2.0 phr (parts per hundred parts of rubber) of sulfur he found that he sacrificed oxidative stability. He therefore prescribed using less than 1.5 phr sulfur for maximum reversion resistance. He failed to realize that this poor stability was due to the predominantly NR compound he was working with. Instead of oxidative stability he found that TCS, or a combination of TCS and BTS, provided the reversion resistance he sought in the NR vulcanizate, because of the short crosslinks produced. Normally, short crosslinks provide improved oxidation stability but they decrease the oxidation stability of NR if TCS is used. The oxidation stability of NR vulcanized with BTS and TCS (which produces short crosslinks) is poorer than when the NR is vulcanized with BTS alone (which produces longer crosslinks).

The oxidation stability of NR with a combination of TCS, or TCS and BTS gets progressively worse as the sulfur level is increased. Carpino was unaware that poor oxidation stability was not due solely to the level of sulfur. Since he worked only with a natural rubber system, he did not learn enough about the effect of the type of tread rubber to enable him to reach any conclusion about the effect of the same accelerators in a SR system. In particular, he missed discovering that the same combination of TCS and BTS accelerators, in a particular range of ratios defining a window of applicability, produces the opposite effect (namely better oxidation stability). Though he used too much combined accelerators for a SR tread compound, this had no bearing on his appreciation for the problem of using too much accelerator since he was in a NR compound. The disclosure of the '588 patent is incorporated by reference thereto as if fully set forth herein.

The same goal of using a high sulfur level challenged Ahagon et al who were concerned with a SR tread compound and provided a solution in U.S. Pat. No. 4,309,318. Though they obtained low rolling resistance in tires with high (3.2.-5.0 phr) sulfur content in a predominantly SBR tread rubber, the oxidative stability was sacrificed as was to be expected for reasons which are well known (see "Oxidation Hardening of "SBR" by M. L. Studebaker and J. R. Beatty, *Rubber Chem. Technol.*, 45, 450 (1972). They made no attempt to maintain the modulus constant (see data in Table 2 of U.S. Pat. No. 4,309,318). Substantially constant is a necessary criterion for making a comparison of tread performance in the present framework of reference.

Polysulfide crosslinks imbue the vulcanizate with high tensile strength, improved flex resistance and tear strength, high heat buildup and compression set, and poor thermal and oxidative stability. Good oxidative and thermal stability, low tensile strength, heat buildup and compression set, poor flex resistance and tear strength are attributable to monosulfide and disulfide crosslinks. Thus, a tire tread composition is always a compromise. This invention provides an unexpectedly good one.

SUMMARY OF THE INVENTION

It has been discovered that a synthetic rubber (SR) tire tread of styrene-butadiene rubber (SBR) and butyl rubber which SR is essentially free of natural rubber (NR), upon vulcanization with sulfur in the presence of a combination of sulfenamide accelerators, provides excellent oxidative stability, resistance to hardening, and flex resistance, despite increasing the level of sulfur to an amount in the range from 2.0-3.0 phr, as long as the total amount of sulfenamide accelerators is less than 2.0 phr and there is more TCS than BTS.

It has also been discovered that the crosslink network generated by the use of TCS in combination with BTS, which combination produces poor oxidation stability in a predominantly NR containing rubber, is not produced in SR.

It is therefore a general object of this invention to provide a SR essentially free from NR, which SR yields a vulcanizate particularly adpated for use in a tire tread which is essentially free from a proclivity to reversion when vulcanized with sulfur in the presence of a combination of BTS and TCS accelerators, said vulcanizate comprising, rising, (i) 100 parts of a SR consisting essentially of at least 90 parts styrene-butadiene rubber (SBR), the remaining being another synthetic high unsaturation rubber selected from the group consisting of cis-polybutadiene, styrene-isoprene, emulsion polybutadiene and ethylene-propylenediene polymer rubber;
(ii) from 2 to 3 phr of sulfur;
(iii) from 0.3 to 1.5 phr of a benzothiazole sulfenamde; and,
(iv) from 0.5 to 1.5 phr of a thiocarbamyl sulfenamide; provided the combined amount of sulfenamides is less than 2 phr and there is more thiocarbamyl sulfenamide than benzothiazole sulfenamide.

It is a specific object of this invention to provide a tire tread composition having the above-identified constituents in the amounts set forth whereby the oxidative stability of its vulcanizate containing at least 10% more sulfur than a BTS vulcanizate (containing BTS but no TCS), and that of the BTS vulcanizate, are essentially identical.

It is another specific object quantitatively to maintain a predetermined modulus, sufficient for the purpose for which the tread is designed, by increasing the sulfur level and decreasing the net amount of sulfenamide accelerators used. The modulus for a typical tire tread is in the range from about 8 MPa (megapascals) to about 10 MPa.

BRIEF DESCRIPTION OF THE DRAWINGS

The foregoing and other objects and advantages of my invention will appear more fully from the following description, made in connection with the accompanying graphs wherein tread compounds are vulcanized with different cure systems, and in which graphs.

DETAILED DESCRIPTION OF PREFERRED EMBODIMENTS

The tread rubber composition ("tread compound") of this invention is synthetic rubber, consisting essentially of at least 60 phr SBR, and more preferably about 70 phr SBR, the remaining SR being selected from the group consisting of halogenated SBR, cis-polybutadiene, ethylene-propylenediene polymer (epdm), emulsion polybutadiene, butadiene-acrylonitrile, isoprene-acrylonitrile, polychloroprene, isoprene-styrene or other unsaturated rubbers. The amount of natural rubber present, if any, is so small as not to affect the properties of the SR appreciably. Most preferably the tread compound is 100 phr SR containing about 70 phr SBR in a masterbatch to be cured with sulfur and a combination of TCS and BTS accelerators.

When vulcanized, the tread compound before aging must meet the criterion for 300% modulus which is a measure of crosslink density. The preferred range of modulus for a tread compound is from about 1200 psi (about 82 MPa or 82 kg/cm²) to about 1800 psi (12.4 MPa or 124 kg/cm²), the most preferred for a passenger car tread compound being about 1300-1500 psi. This value will be determined by the amount of carbon black and other additives, including pigments, antioxidants, antiozonants and the like used, and particularly the type of rubbers. The longer the average length of a crosslink, the more unstable is the compound. The use of BTS as the only accelerator results in relatively long crosslinks and poor oxidation stability.

TCS is represented by the formula wherein A' is selected from the group consisting of and mixtures thereof, $R_a$ and $R_b$ are selected from the group consisting of hydrogen, $C_1$–$C_{24}$ alkyl, $C_2$–$C_{12}$ cyanoalkyl, $C_2$–$C_{12}$ alkoxyalkyl, cycloalkyl containing 4 to 8 ring carbon atoms, phenyl, and $C_7$–$C_{18}$ alkaryl or aralkyl;

R is hydrogen or $C_1$–$C_4$ alkyl; and, x is an integer in the range from 4 to 7.

Specific illustrative compounds including N-oxydiethylenethiocarbamyl-N'-oxydiethylene sulfenamide (OTOS), are identified in the '588 patent. The amount of TCS used is in the range from about 0.5 phr to about 1.5 phr so that the amount of TCS used is always greater than the amount of BTS used.

TCS, when used as the only accelerator, gives vulcanizates with improved thermal stability, improved oxidation stability, lower heat buildup and lower permanent set than those made with BTS as the only accelerator. TCS also gives poorer unaged tear strength and flex-life than BTS. Thus, the goal was to lengthen the crosslinks produced by TCS so as to match the 300% modulus of a SR vulcanizate produced with BTS alone.

BTS is represented by the formula

T—S—B wherein B is selected from the group consisting of wherein $R_c$ and $R_d$ are hydrogen, $C_1$–$C_{24}$ alkyl, $C_6$–$C_{18}$ aryl, $C_7$–$C_{18}$ alkaryl or aralkyl, cycloalkyl containing 3 to 8 ring carbon atoms, R' is hydrogen or $C_1$–$C_4$ alkyl;

z is an integer in the range from 2 to 7; and,

T represents a thiazole ring, especially a benzothiazole ring.

Alkyl in the foregoing may be linear or branched, and may contain primary, secondary and/or tertiary carbon atoms. Aryl, alkaryl, aralkyl, cycloalkyl and thiazole may have $C_1$–$C_8$ substituents.

Specific illustrative compounds including N-oxydiethylene-2-benzothiazole sulfenamide (OBTS), are identified in the '588 patent. The amount of BTS used is in the range from about 0.3 phr to about 1.5 phr. The total amount of TCS and BTS used is in the range from 1 phr to 2 phr. Larger amounts of sulfenamide accelerators require decreasing the amount of sulfur in the masterbatch if the 300% modulus is to remain the same; since it is sought to increase the amount of sulfur to be used, the amount of sulfenamides used is limited to 2 phr.

Additional compounding ingredients may be used in the tread compound, which ingredients include activators such as the oxides of lead, zinc, calcium and magnesium, fatty acids such as stearic and lauric, and salts thereof such as stearates of cadmium, zinc and copper, and lead oleate; antioxidants and antiozonants and stabilizers for degradation due to heat; and sulfur donors such as dithiodimorpholine. Fillers may also be used such as channel blacks, reinforcing blacks, thermal blacks, calcium carbonate and magnesium carbonate, sulfates of barium and and calcium, aluminum silicates, phenol-formaldehyde and polystyrene resins, and the like.

The ingredients are added to the rubber using internal mixers such as a Banbury, a two-roll mill, or the like. The sulfur and the accelerators are added to the rubber near the end of the mixing cycle to minimize premature vulcanization.

The tread compounds described herein were evaluated for physical properties indicative of oxidative stability, by DeMattia Flexlife and Ringflex test procedures.

Crosslink network analysis is done conventionally using phenyl lithium to cleave disulfide and polysulfide chains, and provide a measure of labile sulfur (procedure of Gregg). The procedure involves the measurement of volume swell to give the total crosslink density (moles/gm $\times 10^{-5}$). The vulcanizate is then reacted with phenyl lithium, and measurement of volume swell and crosslink density after this reaction gives a measurement of the monosulfide crosslinks. The polysulfide crosslink density including that of disulfide crosslinks, is equal to the total crosslink density minus the monosulfide crosslink density. Labile sulfur is all sulfur not attached to a C atom, and is measured as thiophenol. Labile sulfur divided by polysulfide crosslink density gives the average number of S atoms per polysulfide crosslink.

Since a comparison of two accelerator systems is being made, the state of cure is held constant, as nearly as possible, which means that the number of crosslinks is the same. Thus, such differences as are measured between the vulcanizates are attributable to the type of crosslinks in each one.

Table I sets forth data for various SBR tire tread compounds made from a SBR/cis-polybutadiene (BR) masterbatch using OBTS alone, and effective OBTS/OTOS mixtures, the former being conventional. 300% modulus is measured both before and after aging, the latter being done under accelerated conditions at 100° C. Actual aging is due to use of the tire in service. The compositions of this invention are predominantly used for passenger tires, tires for vans and small trucks, and for retreading the tires of large trucks. The TCS/BTS curing system is most advantageous in any SR rubber which, upon vulcanization, is to contain the crosslink network devevloped with the use of a relatively high amount of sulfur.

The crosslink density analyses of various vulcanizates are set forth in Table II. A measure of the modulus is the total crosslinks which is essentially the same. Thus the basis for comparison is met. As sulfur level increases the only evident change is the number of sulfurs per polysulfide crosslink. At any preselected sulfur level in the "OBTS only" system, the equivalent number of sulfurs per polysulfide crosslink is obtained at a higher level of sulfur with the OTOS/OBTS system.

Based on the results in the '588 patent we would expect the TCS/BTS vulcanizates to have a higher monosulfide crosslink density than those of BTS. I was surprised to find the polysulfide crosslink density of all vulcanizates was only slightly different, on from the other. However, there is significant difference in the number of S atoms per polysulfide crosslink. At a preselected sulfur level, the TCS/BTS vulcanizates contain fewer S atoms per chain than the vulcanizates from BTS. The number of S atoms per polysulfide crosslink also shows an increase with an increase in sulfur level. Since the percentage of poysulfide crosslinks is essentially the same for all vulcanizates, the differences in physical properties can only be attributed to differences in lengths of polysulfide crosslinks.

Figure 1:
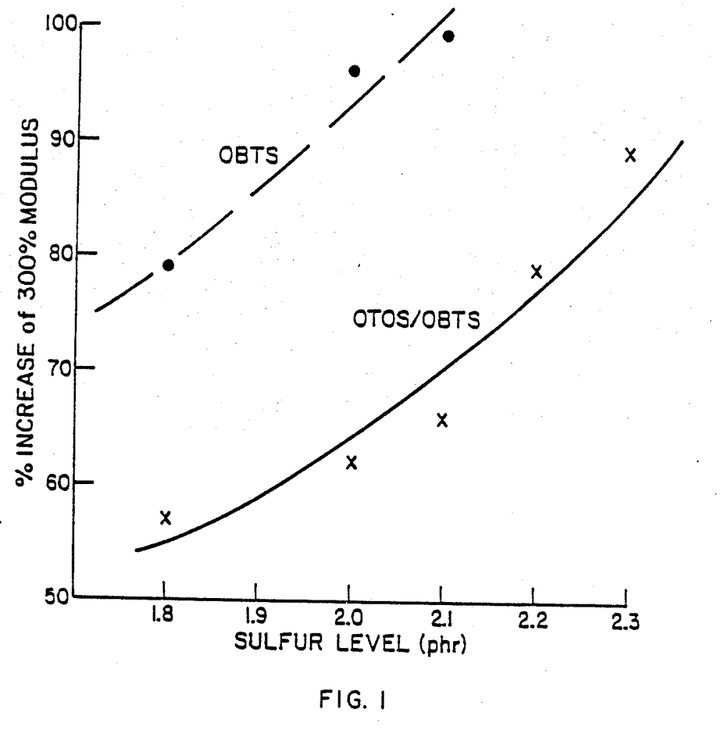
FIG. 1 is a plot of increase of 300% modulus against sulfur level (phr) for a synthetic rubber tread compound containing a particular BTS, namely N-oxydiethylene-2-benzothiazole (OBTS) in one instance, and a mixture of OTOS/OBTS in the other (more OTOS than OBTS in the mixture). OTOS is a particular TCS, namely N-oxydiethyl-enethiocarbamyl-N'-oxydiethylene sulfenamide.

Referring to FIG. 1 there is shown a plot of % increase of 300% modulus against sulfur level (phr) using the same SBR/BR masterbatch with precisely similar amounts of each additive, but with OBTS in one case, and a combination of OTOS/OBTS in the other. To obtain the same, about 77%, increase of 300% modulus obtained with 1.8 phr sulfur in the OBTS cure, one can use 2.25 phr sulfur in the OTOS/OBTS cure.

Analogous results are obtained when the TCS is N,N-dimethyl-N',N'-dicyclohexylthiocarbamyl sulfenamide, and the BTS is OBTS.

Figure 2:
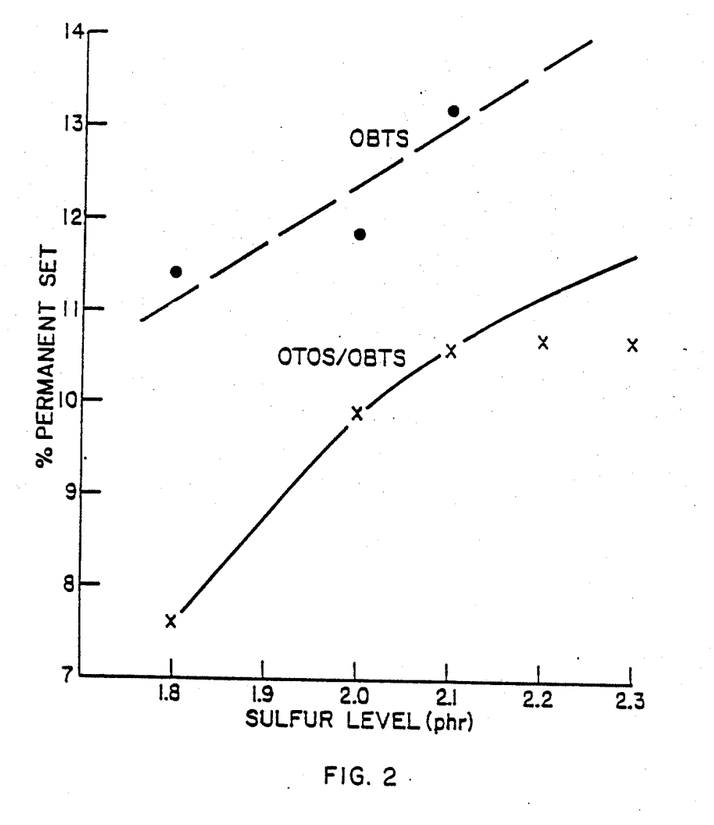
FIG. 2 is a plot of % permanent set against sulfur level (phr) for a synthetic rubber tread compound containing OBTS in one instance, and a mixture of OTOS/OBTS in the other (more OTOS than OBTS in the mixture).

Referring to FIG. 2 there is shown a plot of % permanent set against sulfur level (phr) using the same SBR compound with precisely similar amounts of each additive, but with OBTS in one case, and a combination of OTOS/OBTS in the other. To obtain the same, about 11% permanent set obtained with 1.8 phr sulfur in the OBTS cure, one can use 2.2 phr sulfur in the OTOS-/OBTS cure.

Analogous results are obtained when the TCS is N,N-dimethyl-N',N'-dicyclohexylthiocarbamyl sulfenamide, and the BTS is OBTS.

Figure 3:
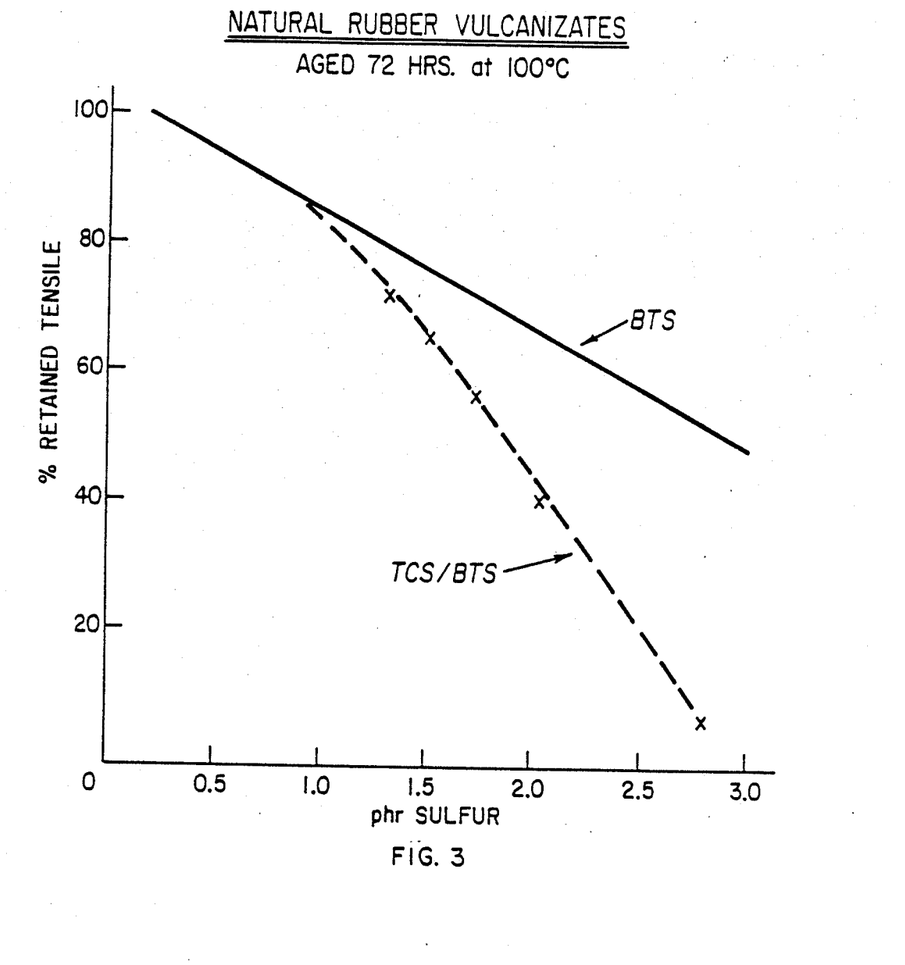
FIG. 3 is a plot of % retained tensile strength against sulfur level (phr) after oxidation at 100° C. for tread compounds of (i) a 50/50 mixture of NR and SBR, and (ii) a SR tread compound, one tread compound containing only BTS, and the other, a mixture of TCS/BTS (more TCS than BTS in the mixture).

Referring to FIG. 3 there is shown a plot of % retained tensile strength against sulfur level (phr) after 72 hr at 100° C., for a tread compound containing only natural rubber. It is evident that with BTS alone, the % retained tensile is much higher than with the combination of TCS/BTS used in the claimed invention. At 2.0 phr sulfur, the NR vulcanizate has lost more than half its tensile, which is the reason for using very low amounts of sulfur in prior art compositions containing sulfenamides.

Figure 4:
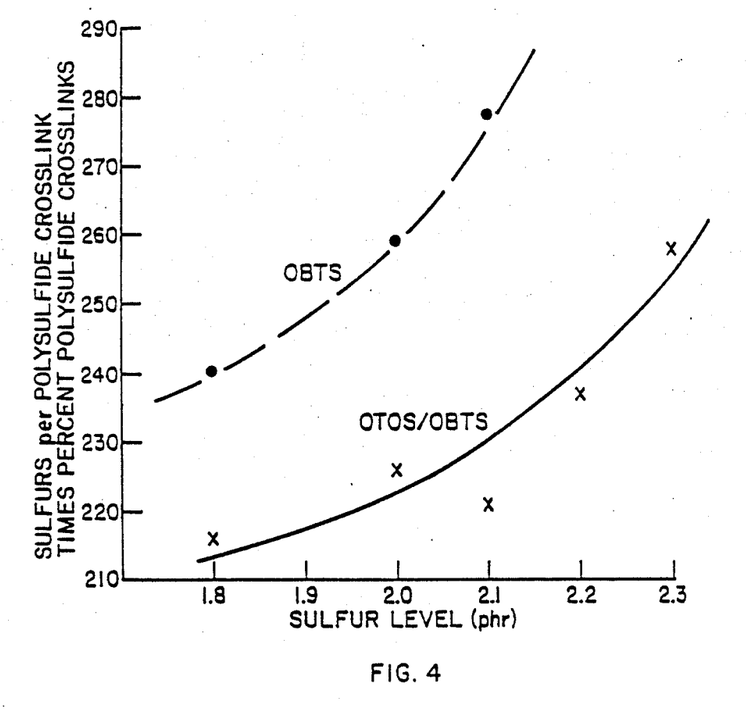
FIG. 4 is a plot of the number of sulfur atoms per polysulfide crosslink multiplied by the percent polysulfide crosslinks using the same masterbatch of synthetic rubber, and OBTS in one case and the mixture of OBTS/OTOS in the other.

FIG. 4 is a plot of the number of sulfur atoms per polysulfide crosslink, multiplied by the percent polysulfide crosslinks, against sulfur (phr) level. It is seen that the value of 240 sulfurs at 1.8 phr sulfur in the vulcanizate containing only OBTS, is obtained at 2.2 phr sulfur when the OTOS/OBTS mixture is used.

EXAMPLES 1-8

A synthetic rubber tread compound is prepared with the following ingredients to yield a masterbatch which is used for each example except for the sulfenamide accelerators which are varied as shown: 55 arts oil extended SBR commercially available as Ameripol ® 1712 (40 parts SBR, 15 parts oil), 25 parts Ameripol ® 1500 SBR, 35 parts Taktene ® 1203 cis-polybutadiene, 3 phr zinc oxide, 2 phr stearic acid, 70 phr HAF carbon black, 20 phr Sundex processing oil, 2 phr Antozite ® 67 and 2 phr Agerite ® Resin D. The ingredients are mixed in a Banbury and portions are further mixed on a two-roll mill when the sulfur and accelerators are added.

The stress-strain tests are conducted to determine modulus in accordance to standard ASTM procedures.

Flex cracking can be a major cause of failure of vulcanized rubber articles subjected to flex. For pneumatic tires, good flex resistance is essential to avoid failure due to groove-cracking. It is well known that groove-cracking involves two distinct steps: crack initiation, followed by crack growth. Vulcanizates of SBR normally resist crack initiation better than those of NR, but once a crack is initiated, it propagates faster in SBR. Crack growth tests are commonly used to evaluate the resistance to groove-cracking of tire treads. The DeMattia method is described in ASTM D813.

As is evident from the data in Table I, the conventionally accelerated samples 1-3 decrease in flex resistance as the sulfur level increases. In contrast, the remaining samples show no significant decrease in flex resistance as the sulfur level increases over the same, and even a broader range.

Tear strength relates to the serviceability of the tread samples and is expressed as the pull in kiloNewtons per meter. Desired high tear strengths are obtained by increasing the sulfur levels regardless of which sulfenamide accelerators are used. Hence the goal of increasing the use of sulfur in the tread composition. Clearly the tear strengths of the samples 5-8 is at least as good as, or better than those of samples 1-3, and of sample 4 with only 1.8 phr sulfur.

Tread design is an important factor in the good performance of tires with reference to traction, both wet and dry, braking, handling, cornering, and skid resistance. To maintain the good performance due to desirable such characteristics, it is vital to maintain the integrity of the tread. Under load, a tire's tread is deformed, and not all the deformation is recovered after the load is removed, resulting in a permanent set caused by tread-smashing, and a loss of performance. For treads cured with conventional BTS accelerators the permanent set increases as the sulfur level increases as is seen in samples 1-3; while there is permanent set in samples 4-8, it is less than those of samples 1-3, and the values for samples 5-8 is unchanged despite the increase of sulfur.

Heat generated in a tire during use, due to hysterisis, can result in premature faiure of the tire and it is desired to minimize heat buildup in the tread. The Goodrich Flexometer test data shows that there is lower heat buildup in samples 4-8 compared to that of samples 1-3, at comparable sulfur levels. Comparable results are obtained at sulfur levels in the range from 2.4 to 3.0.

Both SBR and BR undergo crosslinking when oxidatively degraded. This degradation is evidenced in an increase in modulus so that an increase in modulus is evidence of decreased oxidative stability. The improved oxidative stability obtained by using the combination of OBTS and OTOS accelerators, compared with using only the OTOS, is supported by the stress-strain data after test tube aging for 48 hrs at 100° C., shown in Table I.

At 1.8 phr sulfur in the masterbatch and using only OBTS, there is a 79% increase in 300% modulus, while at the same 1.8 phr sulfur level and 0.51 phr OBTS plus 0.77 phr OTOS, there is only a 57% increase in 300% modulus. The smaller increase in modulus, compared to using only OBTS, is obtained at the other levels of 2.0 and 2.1 phr sulfur. It is only at 2.2 phr sulfur, using 0.32 phr OBTS plus 0.63 phr OTOS that one gets the same 79% increase that one obtains at 1.8 phr sulfur and only OBTS. By combining OBTS and OTOS at comparable sulfur levels the % increase in modulus is always less. Even at the higher sulfur levels, say 2.2 phr (compound 7) with the combination accelerators, the % increase is no worse than at 1.8 phr with only OBTS. In other words, one gets better oxidative stability with the combination of accelerators than with only the OBTS though the sulfur levels are higher.

The sulfur levels range from 1.8 phr to 2.3 phr in Table I because higher sulfur levels give too high an increase in modulus for general purpose use in a tread compound. It should be noted that at 1.8 phr sulfur, the DeMattia flex (unaged) indicates that compound 1 with only OBTS is better than compound 4 with both OBTS and OTOS. At the 2.0 phr sulfur level, compound 5 is better than compound 2; at 2.1 phr sulfur, compound 6 is better than compound 3, and the trend established is continued in compounds 7 and 8.

The unexpected improvement in oxidative stability is corroborated in a wider range of sulfur levels, with the same masterbatch recipe, to include the 3.2 phr sulfur level used at the lower end of the range in U.S. Pat. No. 4,309,318 to Ahagon, in the data presented in Tabe III herebelow. The compounds tested are numbered from 9 to 13, those with an asterisk indicating that the only change in recipe in the compound relative to the numbered compound without the asterisk, is the use of the accelerator combination of this invention. The parts of OBTS, OTOS and sulfur listed for each recipe of the compounds is for the recipe with 214 parts SBR/BR masterbatch, as in Table I. The values obtained for the tests in Table III are offset by a line spacing to avoid confusion when comparing the numbers. The notation that the sample broke indicates that the 300% modulus was too high. No value for ring flex indicates essentially instantaneous 300% crack growth. At 1.8 phr sulfur, using only OBTS proves to be better than the combination of OBTS and OTOS in the DeMattia flex test, but at higher sulfur levels from 2 to 3 phr, the combination is better. At the 3.2 phr level of Ahagon, the combination is worse.

TABLE I

SBR Passenger Tire Tread Compounds

| Compound | 1 | 2 | 3 | 4 | 5 | 6 | 7 | 8 |
|---|---|---|---|---|---|---|---|---|
| SBR/BR masterbatch | 214.0 | 214.0 | 214.0 | 214.0 | 214.0 | 214.0 | 214.0 | 214.0 |
| OBTS | 1.7 | 1.44 | 1.36 | 0.51 | 0.43 | 0.41 | 0.32 | 0.3 |
| OTOS | — | — | — | 0.77 | 0.65 | 0.61 | 0.63 | 0.6 |
| Sulfur | 1.8 | 2.0 | 2.1 | 1.8 | 2.0 | 2.1 | 2.2 | 2.3 |
| Mooney scorch time ($t_5$), min. at 137.7° C. | 22.0 | 21.9 | 21.9 | 18.7 | 18.4 | 17.6 | 16.2 | 16.2 |
| Monsanto Rheometer at 176.7° C. | | | | | | | | |
| Scorch time ($t_2$), min. | 3.0 | 2.9 | 2.9 | 2.7 | 2.8 | 2.8 | 2.8 | 2.7 |
| Cure time ($t_{90}$), min. | 5.9 | 6.0 | 6.3 | 5.4 | 5.8 | 5.8 | 5.8 | 5.8 |
| Cure rate index | 34 | 32 | 29 | 37 | 33 | 33 | 33 | 32 |
| Stress-strain, Opt. cure ($t_{90}$) at 176.7° C. | | | | | | | | |
| Tensile strength, MPa | 20.6 | 20.4 | 20.2 | 20.4 | 20.1 | 18.5 | 19.8 | 19.5 |
| Elongation, % | 540 | 530 | 560 | 540 | 580 | 525 | 530 | 520 |
| 300% Modulus, MPa | 9.5 | 9.7 | 8.9 | 9.5 | 8.4 | 9.0 | 9.4 | 9.5 |
| Stress-strain After Test Tube Aging 48 Hours at 100° C. | | | | | | | | |
| % Retained, Tensile strength | 94 | 90 | 91 | 94 | 92 | 92 | 91 | 89 |
| % Retained, elongation | 64 | 56 | 55 | 70 | 67 | 63 | 59 | 57 |
| % Increase, 300% Modulus | 79 | 96 | 99 | 57 | 62 | 66 | 79 | 89 |
| Goodrich Flexometer (4.4 mm stroke, 249.5 kg load, 100° C. | | | | | | | | |
| Permanent set, % | 11.4 | 11.8 | 13.2 | 7.6 | 9.9 | 10.6 | 10.7 | 10.6 |
| Temperature rise, °C. | 37 | 39 | 39 | 33 | 36 | 37 | 37 | 38 |
| DeMattia Flex, D813, Speared, 25° C. | | | | | | | | |
| Kilocycles to 500% crack growth | 5.3 | 4.3 | 3.9 | 5.0 | 5.1 | 5.0 | 4.1 | 4.3 |
| Tear strength, Die B, 25° C., kN/m | 84 | 82 | 97 | 77 | 81 | 86 | 81 | 103 |
| Tear strength, Die B, 100° C., kN/m | 50 | 54 | 46 | 57 | 54 | 57 | 55 | 53 |

TABLE II

CROSSLINK DENSITY ANALYSIS OF PASSENGER TIRE TREAD COMPOUNDS

| COMPOUND | 1 | 2 | 3 | 4 | 5 | 6 | 7 | 8 |
|---|---|---|---|---|---|---|---|---|
| SBR/BR MASTERBATCH | 214.0 | 214.0 | 214.0 | 214.0 | 214.0 | 214.0 | 214.0 | 214.0 |
| OBTS | 1.7 | 1.44 | 1.36 | 0.51 | 0.43 | 0.41 | 0.32 | 0.3 |
| OTOS | — | — | — | 0.77 | 0.65 | 0.61 | 0.63 | 0.6 |
| SULFUR | 1.8 | 2.0 | 2.1 | 1.8 | 2.0 | 2.1 | 2.2 | 2.3 |
| TOTAL CROSSLINKS (MOLES/GRAM) | 4.43 | 4.68 | 4.81 | 4.77 | 4.47 | 4.67 | 4.94 | 4.57 |
| MONOSULFIDE CROSSLINKS (MOLES/GRAM) | 2.09 | 2.09 | 2.14 | 2.14 | 2.16 | 2.12 | 2.07 | 2.09 |
| PERCENT MONOSULFIDE CROSSLINKS | 47.3 | 44.6 | 44.5 | 44.9 | 48.4 | 45.5 | 42.0 | 45.8 |
| POLYSULFIDE CROSSLINKS (MOLES/GRAM) | 2.33 | 2.59 | 2.67 | 2.63 | 2.31 | 2.55 | 2.86 | 2.48 |
| LABILE SULFUR CONTENT | 6.00 | 6.96 | 7.98 | 4.99 | 5.52 | 5.24 | 6.0 | 6.87 |
| SULFURS PER POLYSULFIDE CROSSLINK | 4.57 | 4.68 | 4.99 | 3.93 | 4.40 | 4.06 | 4.09 | 4.77 |
| PERCENT POLYSULFIDE CROSSLINKS TIMES SULFUR PER POLYSULFIDE CROSSLINK | 240 | 259 | 277 | 217 | 227 | 221 | 237 | 258 |

TABLE III

| Compound #→ | 9 | 9* | 19 | 10* | 11 | 11* | 12 | 12* | 13 | 13* |
|---|---|---|---|---|---|---|---|---|---|---|
| OBTS | 1.7 | 0.42 | 1.36 | 0.34 | 1.12 | 0.28 | 0.88 | 0.24 | 0.65 | 0.16 |
| OTOS | — | 0.85 | — | 0.68 | — | 0.56 | — | 0.48 | — | 0.33 |
| Sulfur | 1.8 | 1.8 | 2.1 | 2.1 | 2.4 | 2.4 | 2.8 | 2.8 | 3.2 | 3.2 |
| 300% modulus, | 920 | | 1205 | | 1315 | | 1325 | | 1260 | |

TABLE III-continued

| Compound #→ | 9 | 9* | 19 | 10* | 11 | 11* | 12 | 12* | 13 | 13* |
|---|---|---|---|---|---|---|---|---|---|---|
| psi |  | 1220 |  | 1065 |  | 1170 |  | 1180 |  | 1220 |
| DeMattia Flex, D813, speared, 25° C. | 18 | 11 | 10 | 15 | 8 | 10 | 6.5 | 7.0 | 6.0 | 5.0 |
| OXIDATIVE STABILITY (Test Tube Aging 48 hrs at 100° C.) | | | | | | | | | | |
| 300% modulus, psi | 1794 | 2013 | 2289 | 1949 | 2656 | 2176 | 3180 | 2478 | broke | broke |
| % increase | 95 | 65 | 90 | 83 | 102 | 86 | 140 | 110 | broke | broke |
| Ring Flex, hrs to 300% crack growth | 35 | 37 | 10 | 16 | 8 | 10 | — | — | — | — |

A further comparison of properties of the tread composition of this invention and of the prior art Ahagon tread composition is set forth in Table IV herebelow. The recipe in Table IV is the same as that used in Tables I, II and III, which is essentially the same as that used by Ahagon. The control compound 17 uses 1.2 parts OBTS which is what Ahagon used because it is an industry norm. Ahagon increased the sulfur level but kept the OBTS level the same since he wanted to reduce hysteresis losses and thus get decreased rolling resistance. On the other hand, compounds 14–16 have sulfur levels from 2.0 to 3.2 parts but the rolling resistance and modulus are intended to be maintained essentially the same as in the control without loss of oxidative stability. As the sulfur level is increased the amount of combined accelerators is decreased, whereby the tensile strength is maintained without increasing the modulus or sacrificing oxidative stability. As one skilled in the art is aware, there is no direct relationship between tensile strength and modulus, yet this unexpected feature of maintaining both the tensile and the modulus is also borne out by the evidence in Table I hereinabove.

Ahagon's data at 100% elongation is corroborated by the data for compounds 14–19, there being an unacceptably high increase of modulus over the control as sulfur level increases; nearly 50% from 2.0 to 3.2 phr sulfur, and again nearly as much from 3.2 to 5.0 phr sulfur. As pointed out hereinabove, the relatively poor oxidative stability of Ahagon's compounds may not have been of concern to Ahagon because his interest was decreasing rolling resistance and getting a lower heat build-up, but maintaining oxidative stability is a primary concern in my tread compound.

The Goodrich flexometer test is carried out with a 0.175" stroke, 55 lb load, at 100° C. The temperature rise measured in °F. and so recorded in the Table IV, is an indication of the heat build-up due to hysteresis. Note that with the combination of accelerators in compounds #s 14, 15 and 16 the heat build-up is higher for #14 than for #s 15 and 16. At the 3.2 phr sulfur level, the heat build-up of #14 is higher than of #18, and it provides better oxidative stability. It ws hot obvious that using a combination of the accelerators would give a modulus to match that of the control, yet allow one to use higher sulfur levels in the narrow range of from 2 to 3 phr without sacrificing the oxidative stability.

TABLE IV

| Compound # | 14 | 15 | 16 | 17* | 18 | 19 |
|---|---|---|---|---|---|---|
| OBTS | 0.14 | 0.26 | 0.3 | 1.2 | 1.2 | 1.2 |
| OTOS | 0.28 | 0.52 | 0.6 | — | — | — |
| sulfur | 3.2 | 2.3 | 2.0 | 2.0 | 3.2 | 5.0 |
| Hardness, Shore A | 80 | 80 | 79 | 80 | 82 | 84 |
| 100% modulus, psi | 478 | 539 | 513 | 483 | 715 | 1017 |
| 200% modulus, psi | 1227 | 1451 | 1401 | 1286 | 1943 | 2618 |
| 300% modulus, psi | 2185 | 2529 | 2460 | 2306 | 3188 | broke |
| Tensile strength, psi | 3372 | 3346 | 3081 | 3341 | 3428 | 3199 |
| Goodrich Flexomether, °F. | 63 | 57 | 59 | 57 | 50 | 47 |

*control

I claim:

1. In a synthetic tread rubber compound essentially free from natural rubber, which compound yields a vulcanizate particularly adapted for use in a passenger tire tread which is substantially free from a proclivity to reversion when vulcanized with sulfur in the presence of a combination of benzothiazole sulfenamide (BTS) and tread compound accelerators, said tread rubber compound comprising,
   (i) 100 parts of a synthetic rubber consisting essentially of at least 60 parts styrene-butadiene rubber, the remaining being another synthetic high unsaturation rubber;
   (ii) from 2 to 2.8 phr of sulfur;
   (iii) from 0.3 to 1.5 phr of a benzothiazole sulfenamide; and,
   (iv) from 0.5 to 1.5 phr of a thiocarbamyl sulfenamide (TCS); provided the combined amount of sulfenamides is more than 1 phr but less than 2 phr, and there is more thiocarbamyl sulfenamide than benzothiazole sulfenamide, whereby the tensile strength is maintained without increasing the modulus or sacrificing oxidative stability.

2. The synthetic rubber vulcanizate of claim 1 containing at least 10% more sulfur than an identical vulcanizate cured with benzothiazole sufenamide as the only accelerator, and having essentially the same oxidation stability.

3. The synthetic rubber vulcanizate of claim 2 wherein said synthetic rubber is selected from the group consisting of cis-polybutadiene, styrene-isoprene, emulsion polybutadiene and ethylene-propylenediene polymer rubber.

4. The synthetic rubber vulcanizate of claim 1 wherein said thiocarbamyl sulfenamide (TCS) is represented by the formula wherein A' is selected from the group consisting of and mixtures thereof, $R_a$ and $R_b$ are selected from the group consisting of hydrogen, $C_1$-$C_{24}$ alkyl, $C_2$-$C_{12}$ cyanoalkyl, $C_2$-$C_{12}$ alkoxyalkyl, cycloalkyl containing 4 to 8 ring carbon atoms, phenyl, and $C_7$-$C_{18}$ alkaryl or aralkyl;

R is hydrogen or $C_1$-$C_4$ alkyl; and, x is an integer in the range from 4 to 7.

5. The synthetic rubber vulcanizate of claim 1 wherein said benzothiazole sulfenamide (BTS) is represented by the formula wherein B is selected from the group consisting of wherein $R_c$ and $R_d$ are hydrogen, $C_1$-$C_{24}$ alkyl, $C_6$-$C_{18}$ aryl, $C_7$-$C_{18}$ alkaryl or aralkyl, cycloalkyl containing 3 to 8 ring carbon atoms, R' is hydrogen or $C_1$-$C_4$ alkyl;

z is an integer in the range from 2 to 7; and, T represents a thiazole ring, especially a benzothiazole ring.

6. The tread compound of claim 1 containing from 2.0 phr to about 2.3 phr of sulfur and from 1.0–2.0 phr total BTS and TCS sulfenamides.

7. The tread compound of claim 6 wherein said BTS is selected from the group consisting of N-oxydiethylene-2-benzothiazole and N-tert-butyl-2-benzothiazole sulfenamide, said tread compounds is N-oxydiethylene-thiocarbamyl-N'-oxydiethylene sulfenamide.

* * * * *